US012544605B2

(12) United States Patent
Rullo et al.

(10) Patent No.: US 12,544,605 B2
(45) Date of Patent: Feb. 10, 2026

(54) ADJUSTABLE BODY BELT HAVING D-RINGS/ATTACHMENTS

(71) Applicant: Buckingham Manufacturing Company, Inc., Binghamton, NY (US)

(72) Inventors: James J. Rullo, Binghamton, NY (US); Kevin W. Truesdell, Binghamton, NY (US)

(73) Assignee: Buckingham Manufacturing Company, Inc., Binghamton, NY (US)

( * ) Notice: Subject to any disclaimer, the term of this patent is extended or adjusted under 35 U.S.C. 154(b) by 0 days.

(21) Appl. No.: 18/331,455

(22) Filed: Jun. 8, 2023

(65) Prior Publication Data

US 2023/0310941 A1 Oct. 5, 2023

Related U.S. Application Data

(63) Continuation of application No. 17/411,422, filed on Aug. 25, 2021, now Pat. No. 11,679,303, which is a continuation of application No. 17/118,941, filed on Dec. 11, 2020, now abandoned, which is a continuation of application No. 15/789,531, filed on Oct. 20, 2017, now Pat. No. 10,946,248.

(Continued)

(51) Int. Cl.
*A62B 35/00* (2006.01)
*A63B 27/00* (2006.01)

(52) U.S. Cl.
CPC ...... *A62B 35/0025* (2013.01); *A62B 35/0006* (2013.01); *A62B 35/0031* (2013.01); *A63B 27/00* (2013.01)

(58) Field of Classification Search
CPC ............ A62B 35/0006; A62B 35/0025; A62B 35/0037; A62B 35/0031; A63B 27/00
See application file for complete search history.

(56) References Cited

U.S. PATENT DOCUMENTS

| | | | | |
|---|---|---|---|---|
| 1,903,081 A * | 3/1933 | Wotherspoon | A41F 9/002 | D29/101.1 |
| 2,127,034 A * | 8/1938 | Kabat | A41F 9/002 | 224/904 |

(Continued)

FOREIGN PATENT DOCUMENTS

| | | | | |
|---|---|---|---|---|
| BR | 3345657 | * | 7/2018 | A62B 35/0006 |
| FR | 2606650 A1 | * | 11/1986 | A62B 35/0006 |

*Primary Examiner* — Colleen M Chavchavadze
(74) *Attorney, Agent, or Firm* — Bond, Schoeneck & King, PLLC; Frederick J. M. Price

(57) ABSTRACT

A single and multiple body belt for use by linemen and others engaged in operations on poles or similar structures having at least a primary body belt, which can be disposed below and detachably connected to a secondary body belt in the multiple body belt configuration. The primary body belt and the secondary body belt each have at least one pair of D-rings. The D-rings, which may differ in size, are separated enough to allow a wearer to distinguish between devices that are normally solely attached to one pair of primary D-rings. The body belts (or other portions) may also have an adjustability section through which a belt strap is woven to either extend or shorten the length of the respective belt strap. The adjustability section allows a lineman to further adjust the tightness of the belt (or other portions) around his or her waist to provide improved support and safety.

22 Claims, 24 Drawing Sheets

Related U.S. Application Data

(60) Provisional application No. 62/464,611, filed on Feb. 28, 2017.

(56) References Cited

U.S. PATENT DOCUMENTS 2,130,724 A * 9/1938 Lewis .................... A62B 35/00 2/310
2,149,803 A * 3/1939 Wight .................... A62B 35/00 224/259
2,152,049 A * 3/1939 Hedrick ................. A62B 35/00 182/9
2,833,454 A * 5/1958 Mcgee ............... A62B 35/0031 182/3
2,834,525 A * 5/1958 Ellis .......................... F16P 1/00 182/9
4,413,358 A * 11/1983 Jimenez .................. A41F 9/005 2/311
4,923,048 A * 5/1990 Cole ...................... A62B 35/04 182/9
5,064,108 A * 11/1991 Headley .................. F21V 23/00 224/663
5,067,585 A * 11/1991 Bell ................... A62B 35/0012 182/7
5,360,384 A * 11/1994 Toensing ........... A63B 21/4009 482/43
5,873,133 A * 2/1999 Jurga ...................... A41F 9/002 2/322
6,839,916 B1 * 1/2005 Chen ....................... A41F 9/002 2/322
10,016,633 B2 * 7/2018 Perner ................ A62B 35/0012
10,369,390 B2 * 8/2019 Levy .................. A62B 35/0025
11,679,303 B1 * 6/2023 Rullo ................. A44B 13/0029 182/3
2007/0152007 A1 * 7/2007 Kauss ....................... A45F 3/14 224/148.2
2015/0114753 A1 * 4/2015 Rullo ................. A62B 35/0037 182/9
2022/0126133 A1 * 4/2022 McGill .............. A62B 35/0006

* cited by examiner

ADJUSTABLE BODY BELT HAVING D-RINGS/ATTACHMENTS

CROSS-REFERENCE TO RELATED APPLICATIONS

The present application is a continuation of U.S. Non Provisional application Ser. No. 17/411,422, filed on Aug. 25, 2021, which is a continuation of U.S. Non Provisional patent application Ser. No. 17/118,941, filed on Dec. 11, 2020, which is a continuation of U.S. Non Provisional patent application Ser. No. 15/789,531, filed on Oct. 20, 2017, which claims priority to and the benefit of U.S. Provisional Patent Application No. 62/464,611, filed on Feb. 28, 2017, the entire contents of which are hereby incorporated by reference.

BACKGROUND

1. Field of Invention

The invention pertains to work positioning devices for linemen and the like and, more particularly, to work positioning devices with single and multiple body belt configurations, each of which have at least one D-rings/attachments and at least one body belt and/or D-piece (or 'D' piece) that is adjustable in length along a major axis thereof.

2. Background of Art

In the electrical power distribution, telecommunications, and other similar industries, linemen are called upon to install and service apparatus and wiring disposed upon poles and other elevated structures. This generally requires that a lineman climb a pole and secure himself or herself in a safe, comfortable position to allow use of both hands to perform the required task atop the pole.

A fundamental item of work positioning equipment for use by linemen and others engaged in aerial tasks is known as a body belt. Body belts for use by lineman and other persons needing to work in elevated locations are well known and widely used. Such body belts are sized and configured to snugly encircle the hips of a lineman. As used herein, the term lineman and its plural, linemen, are intended to encompass any person or persons needing to securely work in an elevated location such as atop a pole.

Body belts of the prior art typically include a pair of D-rings or similar attachment points. As used herein, the term D-ring is intended to include any and all possible shapes and sizes of attachment rings or similar devices suitable for use on a body belt. The belts are provided in a variety of sizes to fit linemen having varying waist measurements. When properly sized, the back bar of the work positioning D-rings of the body belt are located at the prominent part of one hipbone to the same point on the other hipbone. This position is believed to result in maximal convenience and safety.

The usefulness and effectivity of any safety equipment depends greatly upon the willingness of the lineman to properly utilize the equipment. Equipment that is difficult to use or encumbers the lineman in performing his or her job aloft may be defeated, bypassed, or otherwise compromised. It is important, therefore, that any safety equipment be comfortable, be easy to install and remove, and be as unobtrusive as possible to linemen in performing their job.

The D-rings of the body belt form attachment points for a positioning strap. These products support a lineman working aloft and provide the user the ability to work and have free use of both hands. An ever-increasing emphasis on safety has prompted the development and deployment of a vast array or ancillary safety devices such as torso harnesses, fall positioning straps, wood pole fall protection devices, etc. Each of the ancillary devices is typically attached to the D-rings of the body belt. However, the use of some ancillary safety equipment requires detaching and reattaching at least one end of the safety device from the D-ring.

Further, any safety equipment, including the body belt, must fit linemen precisely to provide the utmost level of safety and precaution. However, many conventional body belts only have a tongue buckle which locks into apertures spaced equally along a belt strap. These buckles fail to provide a proper adjustment and fit for linemen of a size between the equally spaced apertures. Similarly, conventional body belts do not allow for any adjustability or versatility of the positioning of D-rings along a similar axis.

It would therefore be desirable to provide a work positioning device with single and multiple body belt configurations, each of which having multiple D-rings/attachments, that is versatile and alleviates crowding of the primary work positioning D-rings, allows attachment of ancillary safety equipment, simplifies the functions required by a lineman atop a pole or other structure, and provides adjustability to linemen of different sizes.

SUMMARY OF THE INVENTION

In accordance with an embodiment, there is provided an improved body belt for use by linemen and others engaged in aerial operations on poles or similar structures. The improved body belt can include a single body belt configuration including a primary belt strap extending along a first major axis and a first horizontal plane having a proximal end and a distal end; a primary D-piece connected to the primary belt strap and extending along the first major axis and the first horizontal plane; a primary pair of D-rings (through which the primary belt strap may but is not required to pass), wherein the primary pair of D-rings are connected to the primary D-piece. The at least one of the primary belt strap and the primary D-piece can include an adjustability section positioned, structured and/or configured to allow adjustment of the length of the primary belt strap or primary D-piece along the first major axis.

In accordance with another embodiment, the improved body belt can include a multiple body belt configuration including a primary belt strap extending along a first major axis and a first horizontal plane having a proximal end and a distal end; a primary D-piece connected to the primary belt strap and extending along the first major axis and the first horizontal plane; a primary pair of D-rings (through which the primary belt strap may but is not required to pass), wherein the primary pair of D-rings are connected to the primary D-piece; a secondary belt strap extending along a second major axis and a second horizontal plane offset from the first major axis and the first horizontal plane, respectively, and having a proximal end and a distal end. The at least one of the primary belt strap and the secondary belt strap can include an adjustability section being positioned, structured and/or configured to allow adjustment of the length of the primary belt strap along the first major axis or the secondary belt strap along the second major axis.

In addition to an improved body belt having an integral attachment to the primary D-rings, secondary D-rings, or an auxiliary set of D-rings, an add-on D-ring assembly is provided for retrofitting body belts of the prior art. The improved body belt can have an added set of attachment points wherein primary D-rings include an integral attachment above or below the primary attachment, and an attachable D-ring assembly adapted for attachment to an existing multiple body belt.

The accompanying drawings are included to provide a further understanding of the invention, and are incorporated in and constitute a part of this specification. The drawings illustrate various embodiments of the invention and together with the description serve to explain the principles and operation of embodiments of the invention.

BRIEF DESCRIPTION OF THE DRAWINGS

The embodied invention will be more fully understood and appreciated by reading the following Detailed Description in conjunction with the accompanying drawings, in which.

DETAILED DESCRIPTION OF THE EMBODIMENT

Embodiments of the present invention pertain to an improved body belt for use by linemen and others engaged on poles or other elevated structures. The improved body belt in accordance with the present invention features an adjustability section, which can be made part of a primary belt, any auxiliary/secondary/tertiary etc. belt and/or D-piece, which may include at least one set (or more of an odd or even number) of D-rings/attachment points, to improve functionality, safety, versatility and adjustability of the body belt. In brief, the adjustability section is positioned, structured and/or configured to allow a user to adjust the length of a belt and/or D-piece portion along a respective major axis thereof.

In accordance with an embodiment, the improved body belt is different from conventional weight or exercise belts, and from certain conventional professional wood pole fall protection safety belts, based in part on the standards/requirements met by the improved body belt in view of the improved body belt's unique structure, configuration, and/or composition. In particular, the improved body belt is formed, structured and/or configured to meet the applicable requirements of ASTM F887 for body belts (as should be understood by a person of ordinary skill in the art in conjunction with a review of this disclosure). In addition, (1) the stitching and thread used in the construction of the improved body belt can be formed, structured and/or configured to have a minimum breaking strength of 42 lbf (the material (e.g., nylon or equivalent thread), construction and/or diameter (range of 0.0150"-0.030") allows for this characteristic, (2) the webbing used in the construction of the improved body belt can be configured to have a breaking strength of not less than 4,500 lbf for a section free of buckle holes and not less than 3,500 lbf for a section containing buckle holes for the specified buckle, (3) the buckles and adjusters used in the construction of the improved body belt can be capable of withstanding a minimum tensile load of 3,372 lbf, (4) the D-rings, O-rings and Oval rings used in the construction of the improved body belt can be capable of withstanding a minimum tensile load of 5,000 lbf, (5) the hardware used in the construction of the improved body belt can have a corrosion resistant finish (made from, e.g., a powder coating with a thickness range of 0.25-12.0 mils, and/or a plating with a thickness of 0.0002-0.0012") and be capable of withstanding a minimum salt spray test of 48 hours (as should be understood by those of skill in the art in conjunction with a review of this disclosure), and (6) the improved body belt can be formed, structured and/or configured to meet the drop test requirements of ASTM F887.

Figure 1:
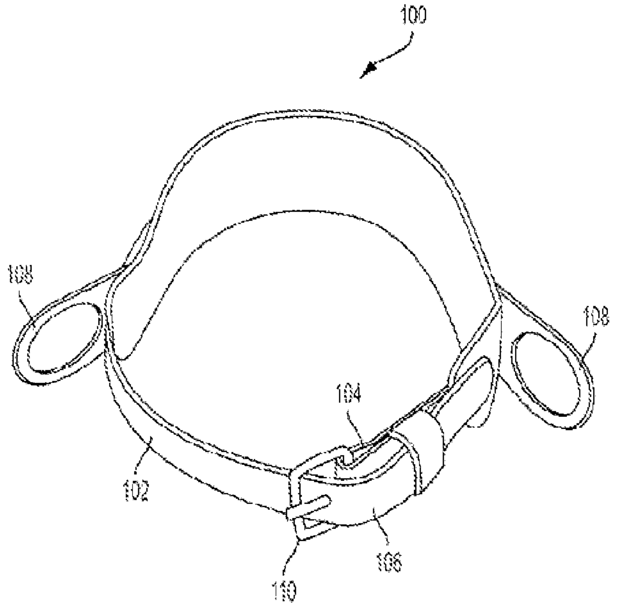
FIG. 1 PRIOR ART
FIG. 1 is a perspective view of a typical body belt of the prior art.

Referring first to FIG. 1, there is shown a perspective view of a conventional body belt of the prior art, generally at reference number 100. Body belt 100 is designed to encircle the torso of the human at a point slightly above the wearer's hips, not shown. Body belt 100 has a belt strap 102 having a proximal end 106 and a distal end 104 terminating in a buckle 110. A pair of D-rings 108 is disposed on belt strap 102 of body belt 100 in positions to be substantially adjacent the midpoint of the wearer's right and left hips.

Figure 2:
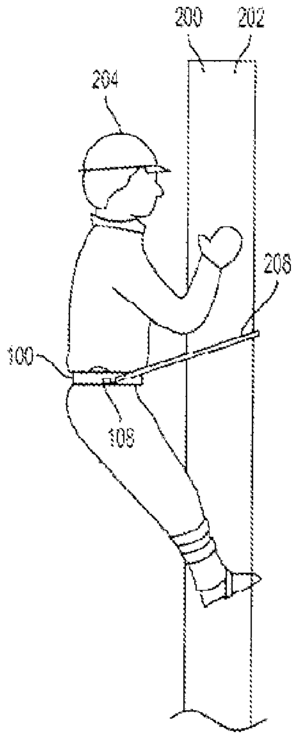
FIG. 2 PRIOR ART
FIG. 2 is a schematic view of a lineman wearing the body belt of FIG. 1 and being deployed on a pole.

Referring now to FIG. 2, there is a simplified schematic view 200 of a lineman 204 on a pole 202. Lineman 204 is wearing the prior art body belt 100. Attached to D-rings 108 of body belt 100 is a positioning strap 208.

Figure 3:
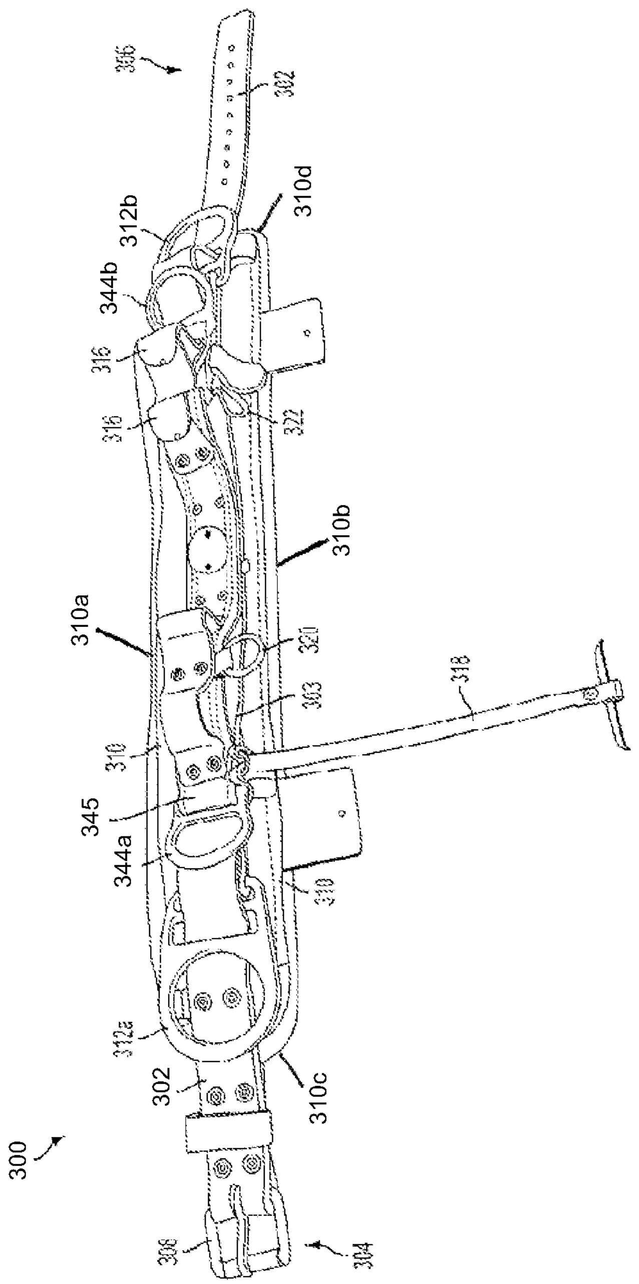
FIG. 3 is a front perspective view of a primary body belt in accordance with the invention.
Figure 4:
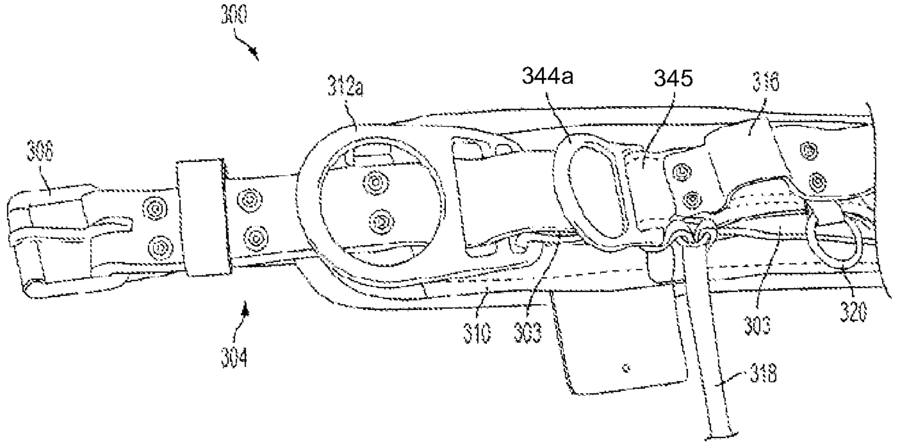
FIG. 4 is an enlarged view of an end portion of the primary body belt of FIG. 3.
Figure 5:
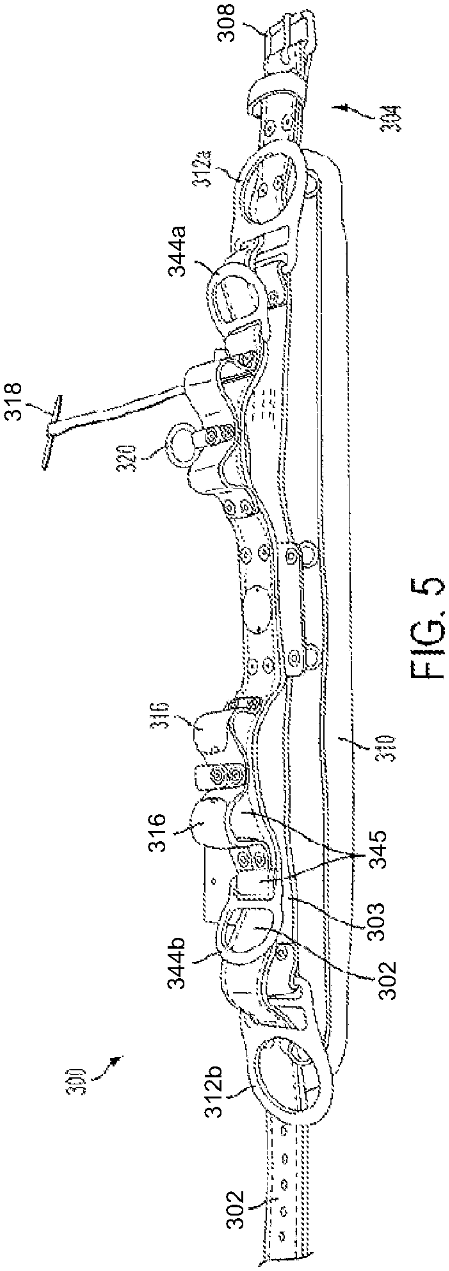
FIG. 5 is a top perspective of the primary body belt of FIG. 3.

Referring now to FIGS. 3, 4, and 5, there is shown a perspective view, a partial, detailed, perspective view, and a top perspective view, respectively, of a single belt embodiment having a primary body belt 300 and a body portion 310. As seen in the depicted embodiment, an auxiliary, distal D-ring 344*a* is disposed rearward of a primary, distal D-ring 312*a*. Likewise, an auxiliary, proximal D-ring 344*b* is disposed rearward of a primary proximal D-ring 312*b*. The auxiliary D-rings 344*a*, 344*b* are attached to a primary belt strap 302 by auxiliary D-piece 345 (see FIGS. 3 and 4). The term rearward is used with reference to the body of a wearer, not shown, when the primary body belt 300 is properly positioned thereupon. Primary belt strap 302 has a proximal end 306 and a distal end 304. A buckle 308 is shown securely fastened to the primary belt strap 302 at distal end 304.

In the embodiment chosen for purposes of express disclosure, auxiliary D-rings 344*a*, 344*b* are shown smaller than primary D-rings 312*a*, 312*b*. It will be recognized that in alternate embodiments, auxiliary D-rings 344*a*, 344*b* could be of an equal or a larger size than primary D-rings 312*a*, 312*b*. Consequently, the multiple body belt 800 is not limited to any particular size relationship between primary D-rings 312*a*, 312*b* and auxiliary D-rings 344*a*, 344*b*. Rather, the invention includes any size relationship between primary D-rings 312*a*, 312*b* and auxiliary D-rings 344*a*, 344*b*. This relative size relationship applies to all D-ring combinations shown and discussed herein.

The auxiliary D-rings 344*a*, 344*b* may be flat or angled slightly outward, as shown, typically at an approximately 30° angle. The angle facilitates grasping the auxiliary D-rings 344*a*, 344*b* by the wearer of body belt 300 as auxiliary D-rings 344*a*, 344*b* may be out of sight of the wearer. In addition, the auxiliary D-rings 344*a*, 344*b* may be in line with the secondary D-rings 314*a*, 314*b*.

The two sets of D-rings (primary and auxiliary) embodiment provides significantly improved functionality and resultant safety. A user can spread the attachments (e.g., snap hooks) for ancillary safety equipment (not shown) between primary D-rings 312*a*, 312*b*, and auxiliary D-rings 344*a*, 344*b*, as well as the secondary D-rings 314*a*, 314*b* (in the multiple body belt 800 embodiment, discussed below). It will be recognized by those of skill in the art that numerous strategies can be used for deciding what ancillary equipment is attached to which D-ring. Regardless of a chosen strategy, a wearer has fewer devices attached to any given D-ring 312*a*, 312*b*, 344*a*, 344*b*, 314*a*, 314*b* when using the novel single 300 and multiple body belts 800 described and illustrated herein. This naturally results in easier detachment and reattachment of any safety devices that must be detached when, for example, an obstacle is encountered.

Referring now to FIG. 4, the distal, primary D-ring 312*a* is affixed to primary belt D-piece 303 in a position coincident with a midpoint of the left side of a wearer hip when the body belt 300 is properly fitted to a wearer (not shown). Likewise, the primary body belt 300 also has a proximal, primary D-ring 312*b* affixed to primary belt D-piece 303 at a position coincident with a midpoint of the right hip of a wearer of body belt 300 when properly fitted to the wearer (as discussed above, not shown).

As shown in FIGS. 3-5, other ancillary pockets, rings and attachment points, for example, tool loops 316, tape thong 318, accessory ring 320, and accessory snap 322, are shown attached to the primary belt strap 302 of the primary body belt 300.

The primary and auxiliary D-ring attachment, structure and configuration, and related D-piece assembly, shown and described with respect to FIGS. 3-5 can also be incorporated into at least one belt of the multiple body belt embodiment 800, discussed below.

Figure 8:
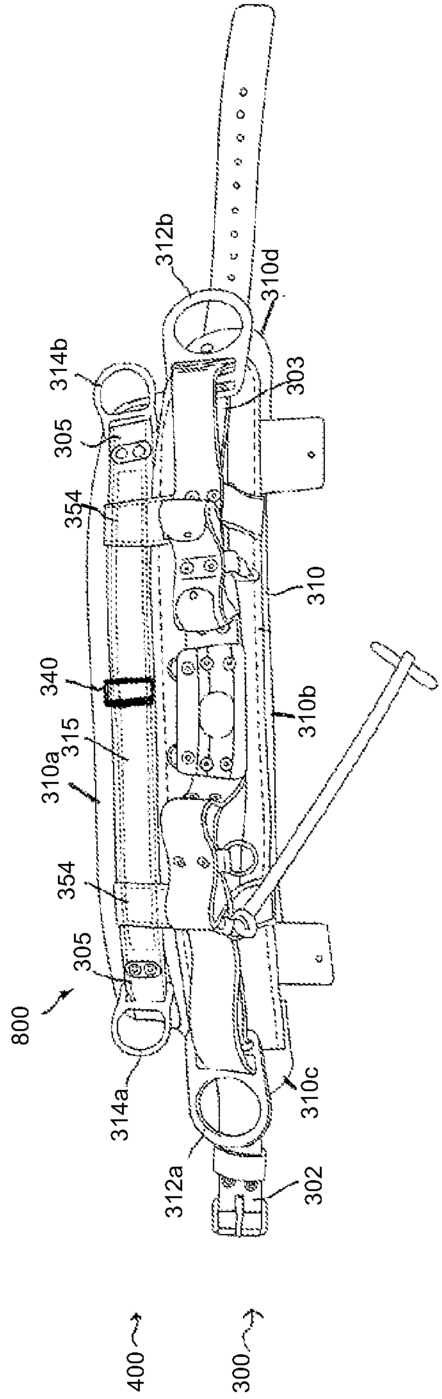
FIG. 8 is a front perspective view of a primary body belt and a streamlined, secondary body belt having a secondary set of D-rings, in accordance with the invention.

Referring to FIG. 8, there is shown a perspective view of a multiple (here double) body belt 800 having both a primary set of D-rings 312*a*, 312*b* and a secondary set of D-rings 314*a*, 314*b* in accordance with an alternative embodiment of the invention. The primary body belt 300 (which is similar to the primary body belt 300 of FIGS. 3-5, could be on top, but as shown is on the bottom; and could be in the middle in a multiple body belt configuration) has two D-rings 312*a*, 312*b* attached thereto (but could have multiple sets of D-rings, as shown, for example, with respect to FIGS. 3-5, discussed above). In the depicted embodiment, vertical connector straps 354 are attached to primary body belt 300 in a manner well known to those skilled in the art. The vertical connector straps 354 hold the primary body belt 300 in place while still allowing the primary belt strap 302 to slide therethrough when the primary body belt 300 is adjusted (as discussed herein). In the depicted embodiment, the vertical connector straps 354 extend upwardly to respective positions on a secondary body belt 400, which is disposed above the primary body belt 300. However, in an alternative embodiment (not shown), there may be separate vertical connector straps 354 for each of the primary body belt 300 and the secondary body belt 400.

Still referring to FIG. 8, the secondary body belt 400 is connected to a secondary set of D-rings 314*a*, 314*b*, providing a third and fourth D-ring in accordance with the invention. The secondary body belt 400 provides additional hip and back support to the linemen. The secondary body belt 400 may be integrally formed, detachably connected to the primary body belt 300 or, as stated above, the vertical connector straps 354 may attach, by stitching or other means, the secondary body belt 400 to the primary body belt 300. Although two vertical connector straps 354 are shown, it should be understood that a greater number of such connector straps as well as attachment methods can also be used without departing from the scope of the invention.

As noted above, the secondary body belt 400 has its own set of D-rings 314*a*, 314*b*, rather than providing all four D-rings in a common plane (although, each belt 300 and 400 can have multiple sets (including odd numbers) of D-rings, as described, for example, with respect to FIGS. 3-5). Providing a secondary set of D-rings 314*a*, 314*b* in separate planes decreases the amount of concentration required to sort out numerous devices from a crowded D-ring and decreases the risk of a linemen accidentally releasing the safety device from the D-ring. One plane encompasses the first set of D-rings 312*a*, 312*b* (on the primary body belt 300) and a second, parallel plane can be for the secondary set of D-rings 314*a*, 314*b* (on the secondary body belt 400). Once again, the size of primary body belt D-rings 312*a*, 312*b* is not necessarily the same as the size of secondary D-rings 314*a*, 314*b*. In the embodiment shown in FIG. 8, the secondary body belt 400 is shorter in length than the primary body belt 300 and the primary D-rings 312*a*, 312*b* have a relatively larger diameter than the secondary D-rings 314*a*, 314*b* (although all relative length and size combinations are contemplated). In addition, the primary D-rings 312*a*, 312*b* need not be aligned (but can be) with the secondary D-rings 314*a*, 314*b*, as shown unaligned in FIG. 8. When the primary D-rings 312*a*, 312*b* and the secondary D-rings 314*a*, 314*b* are not aligned, the D-rings can be less crowded, making it easier for linemen to differentiate between each D-ring.

Similarly to primary D-rings 312*a* and 312*b*, D-rings 314*a*, 314*b* can be affixed to D-pieces such as secondary belt D-pieces 305. In the embodiment shown in FIG. 8, the distal, secondary D-ring 314*a* is affixed to secondary belt D-piece 305 in a position above and rearward distal, primary D-ring 312*a* when the multiple body belt 800 is properly fitted to a wearer (not shown). The proximal, secondary D-ring 314*b* affixed to secondary belt D-piece 305 in a position above and rearward proximal, primary D-ring 312*b* when the multiple body belt 800 is properly fitted to a wearer (not shown).

Similar to the primary body belt 300 shown in FIG. 3, the primary body belt 300 of the multiple body belt 800 has a primary belt strap 302 having a proximal end 306 and a distal end 304. A buckle 308 is securely fastened to the primary belt strap 302 at distal end 304. The multiple body belt 800 also comprises a secondary body belt strap 315 along the secondary body belt 400. In some embodiments (not shown), the secondary belt strap 315 may also comprise a proximal end and a distal end, with a buckle securely fastened at the distal end. A belt strap and attached buckle provide a fastening mechanism for linemen to secure the multiple body belt around himself or herself.

Figure 6:
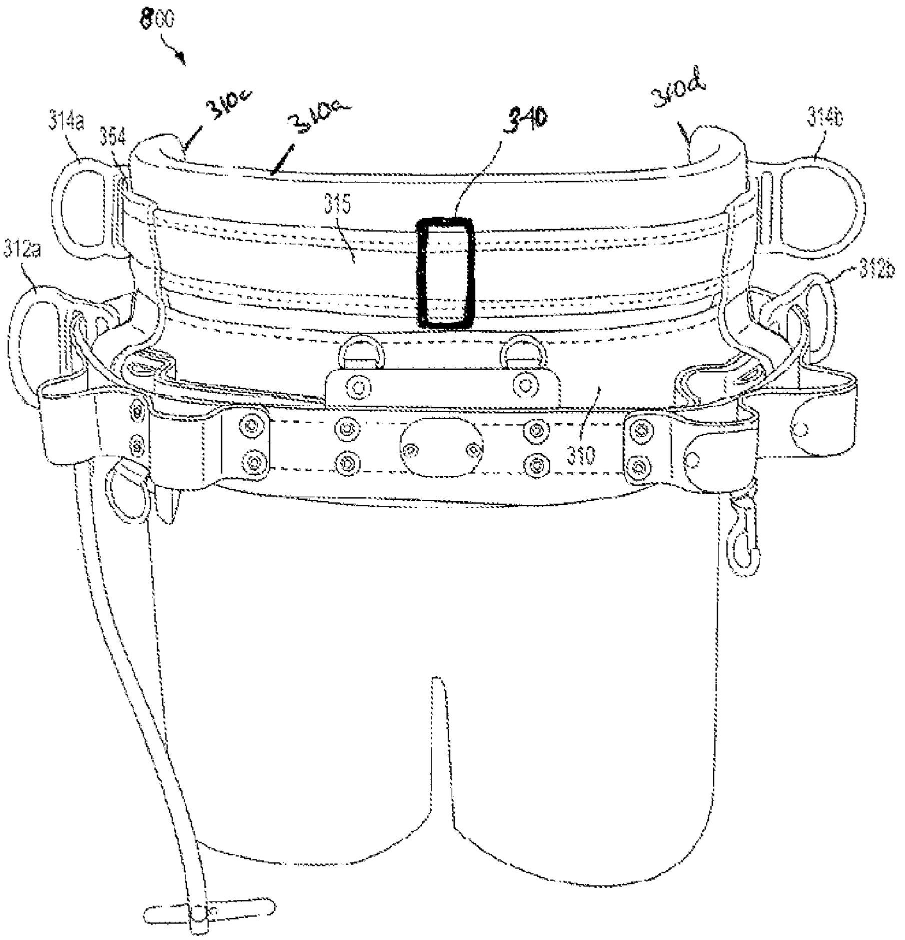
FIG. 6 is a front perspective view of a primary body belt and an secondary body belt having a secondary set of D-rings, in accordance with the invention.

In some embodiments, both the single body belt 300 and the multiple body belt 800 may also comprise body portion 310 which can include padding (see, e.g., FIGS. 3 and 8). A first surface of the body portion 310 can be affixed to an inside surface (i.e., the surface against a wearer's back, not shown, when the multiple body belt 800 is in use) of the primary belt strap 302. The body portion 310 can also be seen in FIG. 6, which shows a front perspective view of a multiple body belt 800 having both primary D-rings 312*a*, 312*b* and secondary D-rings 314*a*, 314*b*. In alternative embodiments (not shown), the multiple body belt 800 may also comprise secondary body padding affixed to the inside surface of the secondary body belt 400 to provide additional comfort and support to the wearer. Whatever particular structural configuration of the body portion 310 as described herein and shown in the Figures, whether it is made of one component or more than one component attached to one another in a stacked (top to bottom or left to right) or other attached configuration as contemplated herein, the body portion 310 as a whole has a perimeter including a top most portion 310*a*, a bottom most portion 310*b* and two side most portions 310*c* and 310*d*. At least a less than full portion of the top perimeter 310*a* can be configured to extend in a first plane and at least a less than full portion of the bottom perimeter 310*b* can extend in a second plane, where the first and second planes can be (but are not required to be) parallel to and offset from one another. At least a less than full portion of the side perimeter 310*c* can be configured to extend in a third plane and at least a less than full portion of the side perimeter 310*d* can extend in a fourth plane, where the third and fourth planes can be (but are not required to be) parallel to and offset from one another. Each of the belt straps can be connected to a first surface of the body portion 310 and be positioned between the top perimeter 310*a* and the bottom perimeter 310*b*.

Each of the single body belt 300 embodiment and the multiple body belt 800 embodiment can include an adjustability section 340, which can be made part of the primary belt 300, the secondary belt 400, and any other auxiliary/secondary/tertiary etc. belt and/or D-piece 303/305, which may include at least one set of D-rings/attachment points. The adjustability section 340 can be positioned, structured and/or configured to allow a user to adjust the length of a belt and/or D-piece portion along a respective major axis thereof. FIGS. 10*a-h* depict numerous exemplary embodiments of suitable adjustability sections 340, many of which include buckle assemblies that allow the pass-through and loosening/tightening/securing of webbing/straps to provide for the length adjustment of the belt and/or D-piece portion.

Referring back to FIGS. 6 and 8, for example, there are shown front perspective views of the multiple body belt 800 according to an embodiment of the present invention. In the depicted embodiment, the secondary body belt 400 is shown with marking indicating the location of a central adjustability section 340. The term "central" is used to describe the location of the adjustability section 340 as between the two secondary D-rings 314*a*, 314*b* and their respective affixed D-pieces 305, and thus does not limit the location of the secondary central D-piece 340 to the center of the secondary body belt 400.

Figure 14A:
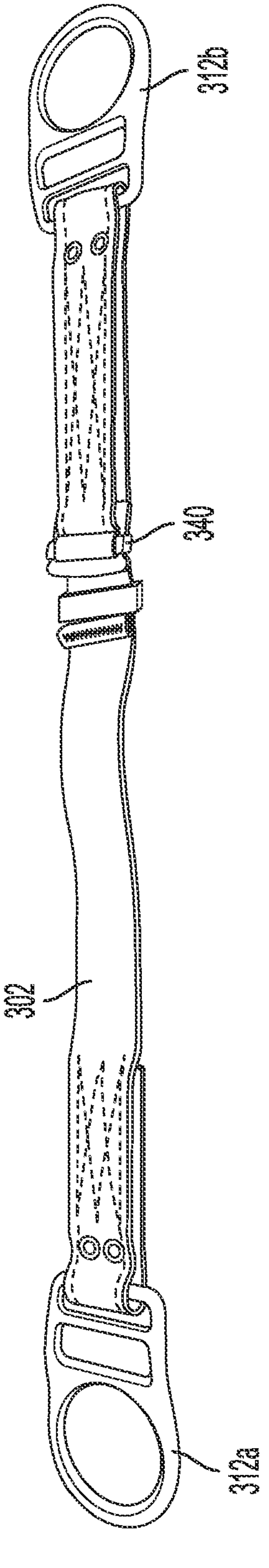
FIG. 14A is a front perspective view of the adjustability section on a primary belt strap in accordance with an embodiment.
Figure 14B:
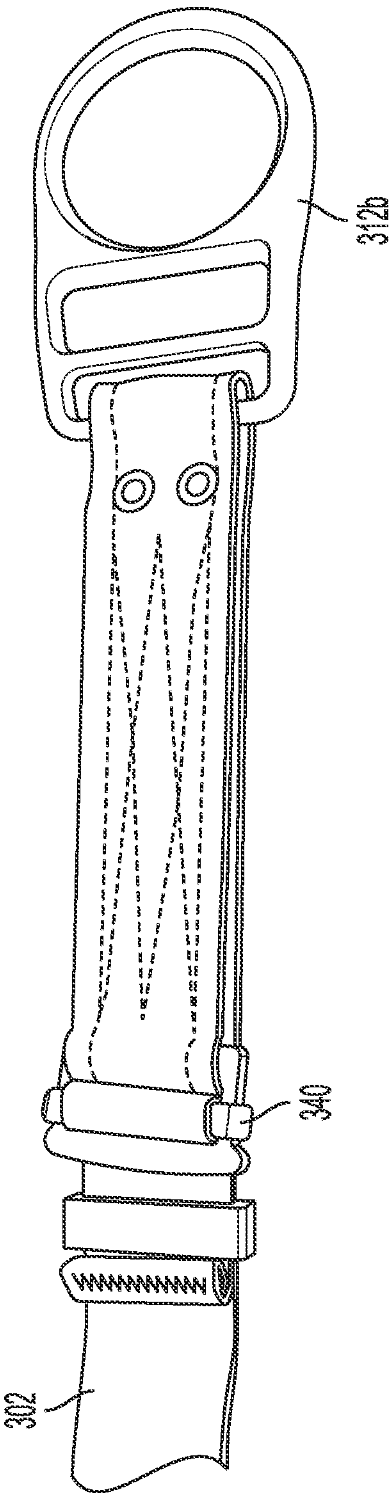
FIG. 14B is a close-up perspective view of the adjustability section shown in FIG. 14A in accordance with an embodiment.
Figure 14C:
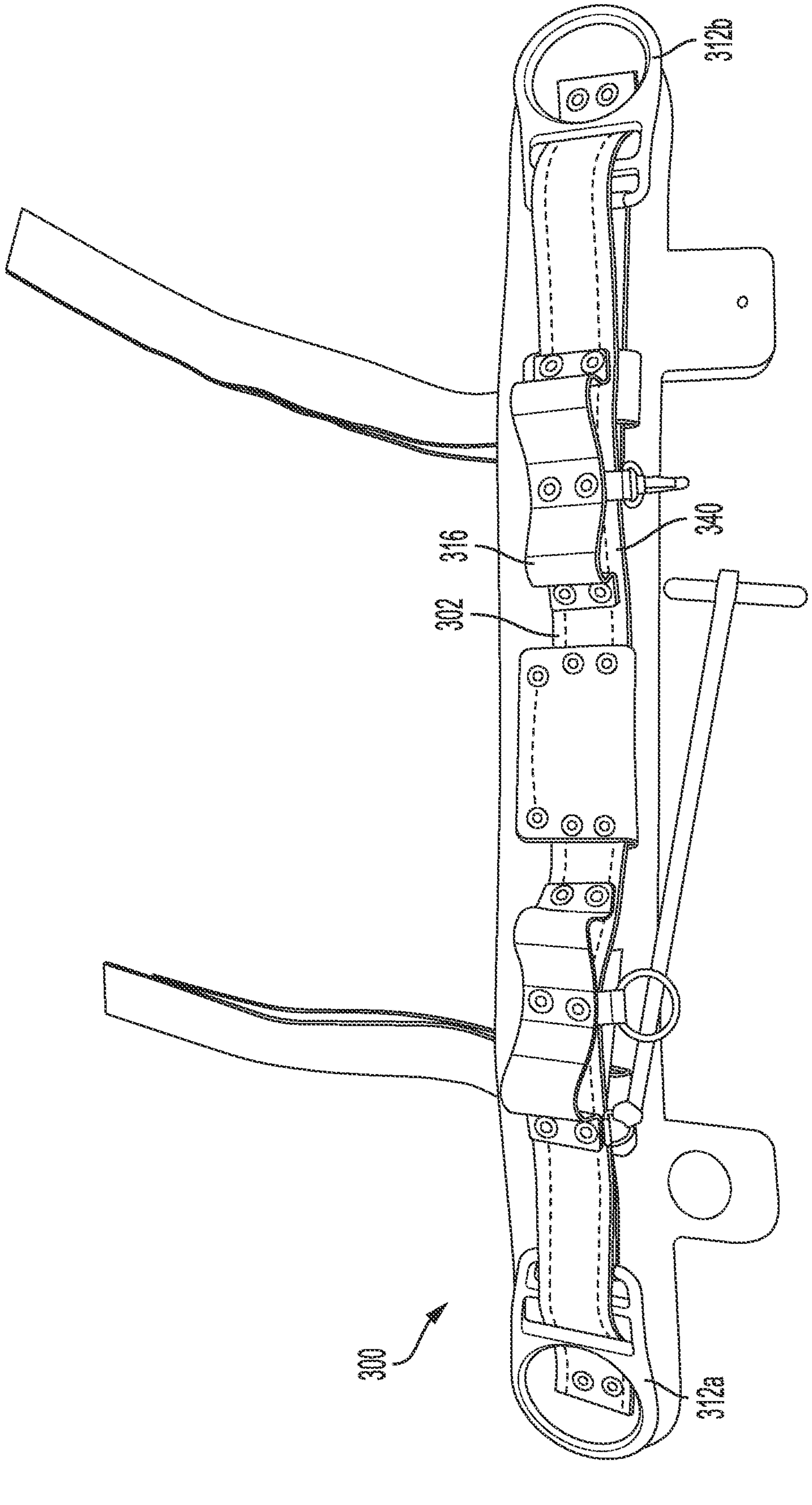
FIG. 14C is a front perspective view of the adjustability section on a primary belt in accordance with an embodiment.

Additional examples of portions of a disassembled and an assembled primary body belt 300 and a multiple body belt 800 with a central adjustability section 340 are shown in FIGS. 14A-D, according to an embodiment. Referring first to FIG. 14A, there is shown a front perspective view of the adjustability section 340 on a primary belt strap 302 between two primary D-rings 312*a*, 312*b*. FIG. 14B shows a close-up perspective view of the adjustability section 340 from FIG. 14A. As the adjustability section 340 can be on the primary belt strap 302 between primary D-rings 312*a*, 312*b*, the adjustability section 340 can also be incorporated into the primary body belt 300, as shown in FIG. 14C. In the embodiment depicted in FIG. 14C, the adjustability section 340 is positioned on the primary belt strap 302 beneath a tool loop 316.

Figure 14D:
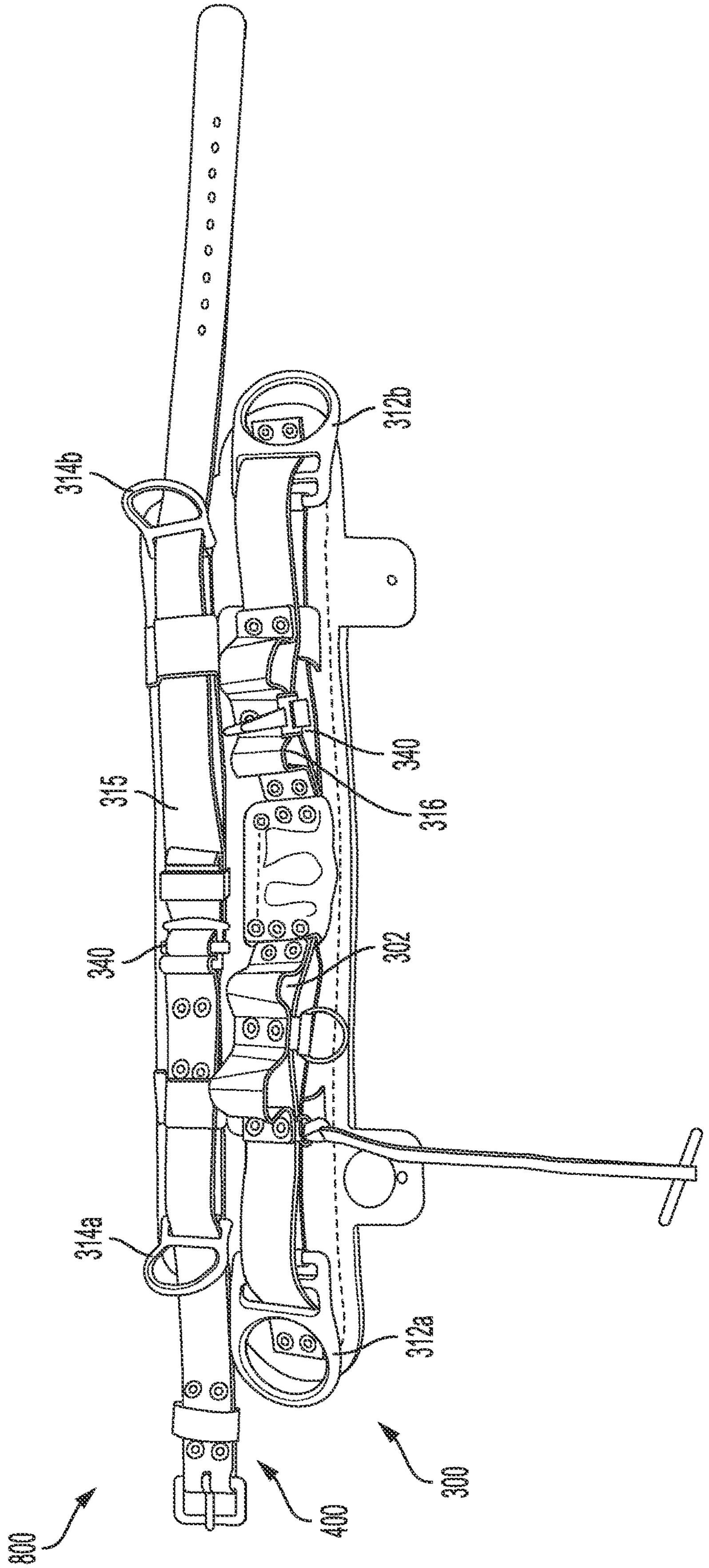
FIG. 14D is a front perspective view of the adjustability section on a multiple body belt in accordance with an embodiment.

Referring now to FIG. 14D, there is shown a front perspective view of the adjustability section 340 on a multiple body belt 800 on both the primary body belt 300 and the secondary body belt 400. The adjustability section 340 on the primary body belt 300 is in comparable positioning to adjustability section 340 in the embodiment shown in FIG. 14C. Regarding the secondary body belt 400, the adjustability section 340 is shown on the secondary body belt strap 315 between the two secondary D-rings 314*a*, 314*b* similar to the embodiment shown in FIG. 8.

Figure 11A:
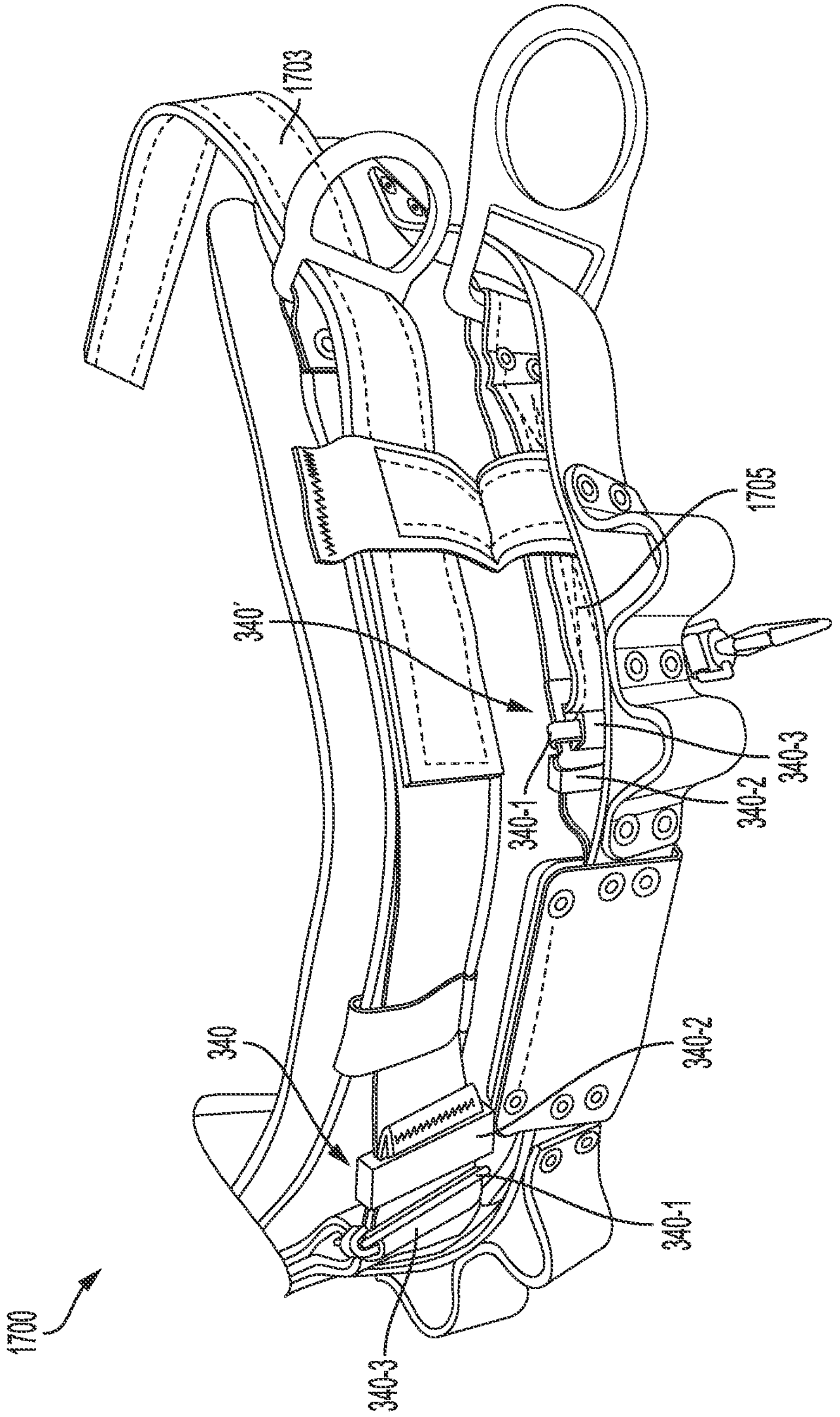
FIG. 11A is a front perspective view of a multiple body belt in accordance with an embodiment.
Figure 11B:
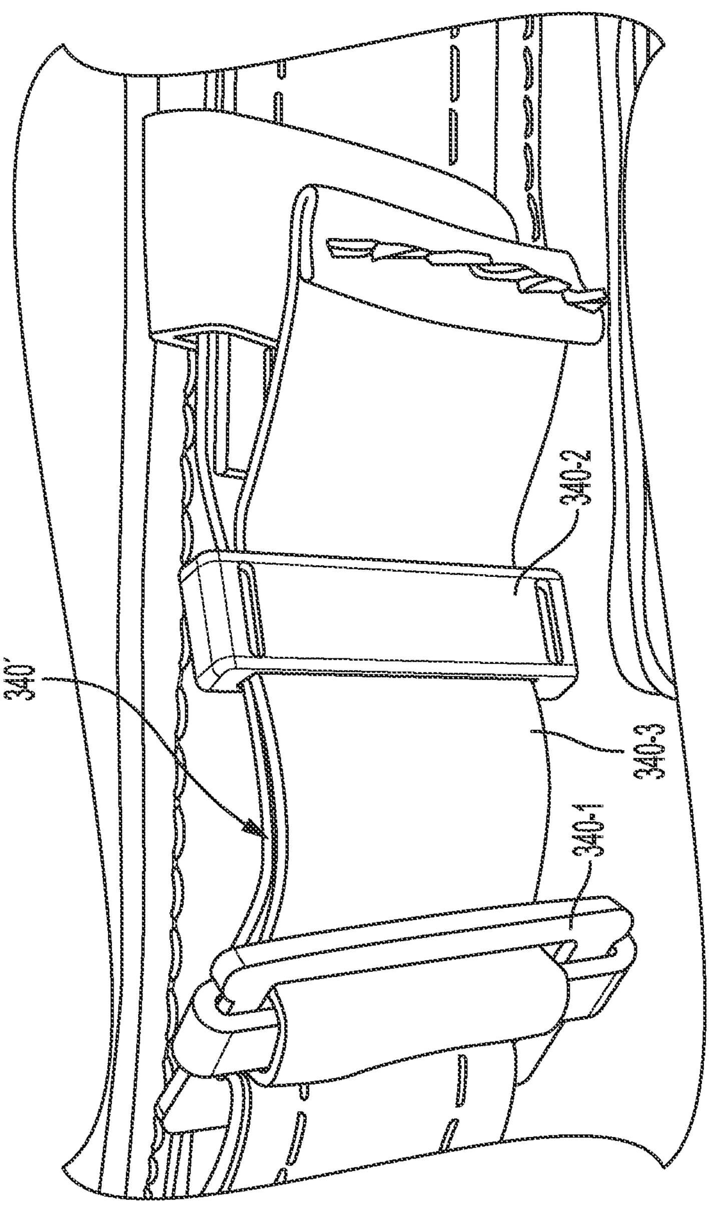
FIG. 11B is a magnified view of an adjustability section of the multiple body belt shown in FIG. 11A in accordance with an embodiment.

Turning to FIGS. 11A-B, example adjustability sections 340, 340' in use are shown in a multiple body belt configuration. FIG. 11A shows the multiple body belt embodiment 1700 (similar in certain instances to multiple body belt 800) with an adjustability section 340 for a belt strap 1703 and a similar adjustability section 340' for the D-piece 1705 (configured and structured to lengthen or shorten the overall length of the belt strap 1703 and D-piece 1705, respectively). Each adjustability section 340, 340' includes, but is not limited to a buckle assembly 340-1, which allows for the pass through and pass back of a webbing 340-3, and a clip/friction bar 340-2 to capture the webbing that is passed back to hold the particular length adjustment.

Figure 7:
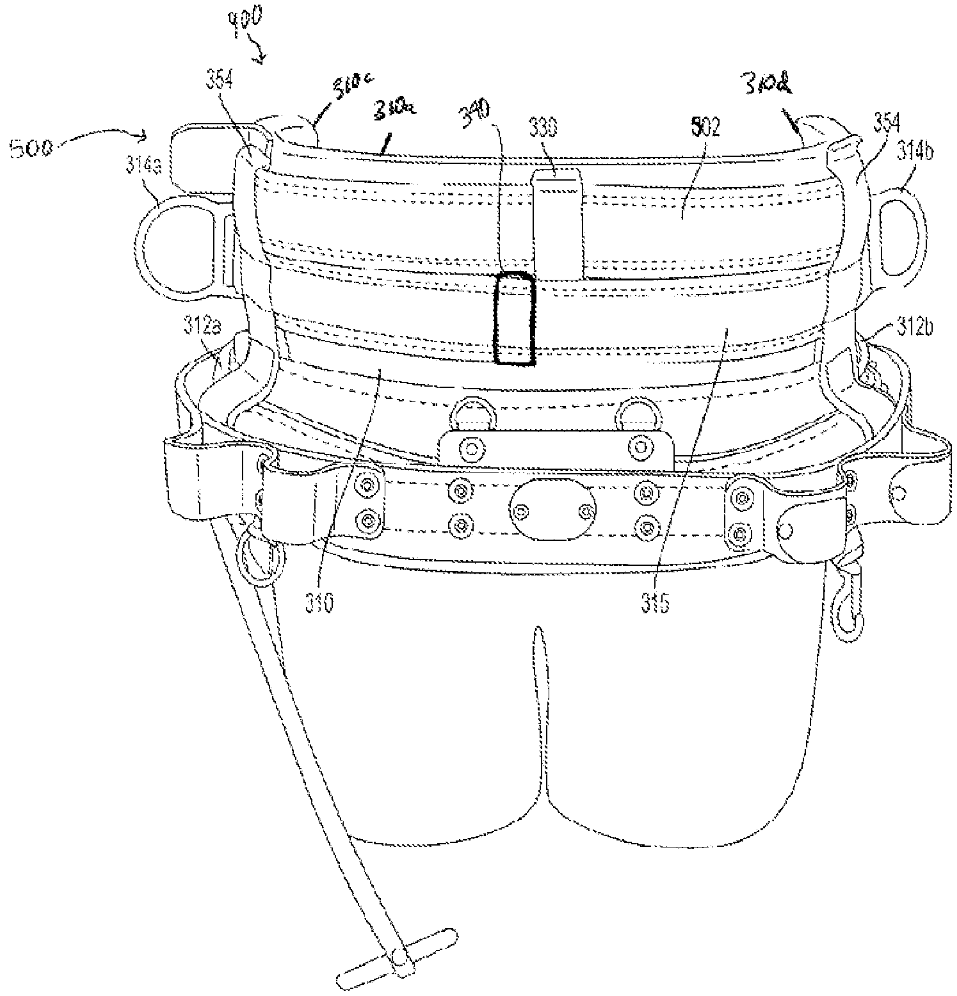
FIG. 7 is a front perspective view of a triple body belt having primary body belt, secondary body belt, and tertiary body belt, similar to FIG. 6.
Figure 9A:
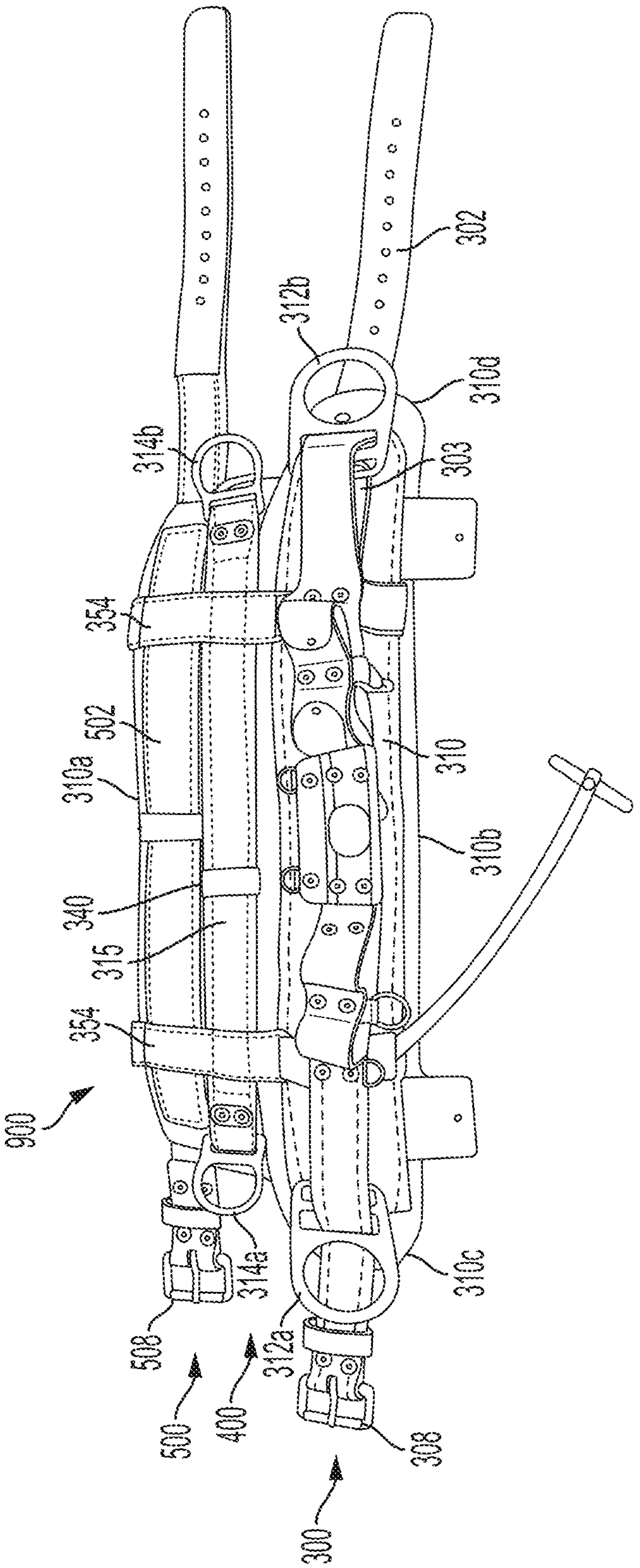
FIG. 9A is a front perspective view of a triple body belt having primary body belt, secondary body belt, and tertiary body belt, similar to FIG. 8.

Referring now to FIGS. 7 and 9A, there are shown front perspective views of a triple body belt having primary body belt, secondary body belt, and tertiary body belt. As seen in the depicted embodiment, the multiple body belt 800 and its above referenced features are incorporated into a triple body belt 900 having an added tertiary body belt 500 for additional support. For example, FIG. 9A shows a triple body belt having primary body belt 300, secondary body belt 400, and tertiary body belt 500. Primary body belt 300 is shown having a buckle 308, a primary belt strap 302 connectable to the buckle 308, and d-rings 312*a* and 312*b*. The secondary body belt 400 includes secondary body belt strap 315, d-rings 314*a* and 314*b*, and having no buckle or a portion of secondary body belt strap 315 that would be connectable to buckle. The tertiary body belt 500 includes tertiary belt strap 502 connectable to the buckle 508, and having no d-rings. Embodiments of the present invention are not limited to this particular design. Stated differently, each belt can either have a buckle or no buckle, and none to one or more d-rings.

Figure 9B:
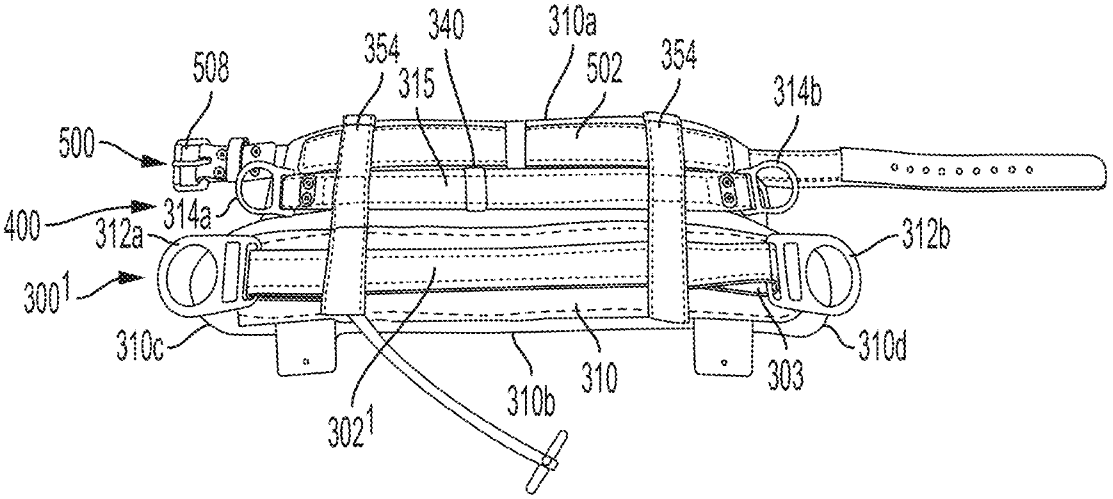
FIG. 9B is a front perspective view of a triple body belt having primary body belt, secondary body belt, and tertiary body belt according to an alternative embodiment.

For example, turning to FIG. 9B, a front perspective view of a triple body belt having primary body belt, secondary body belt, and tertiary body belt according to an alternative embodiment is shown. This alternative embodiment shows a triple body belt having an alternative primary body belt 300', and also includes the secondary body belt 400 and the tertiary body belt 500 as show in FIG. 9A. Alternative primary body belt 300' includes d-rings 312*a* and 312*b*, and does not include buckle or a portion of the primary belt strap 302' that would be connectable to buckle as shown in the FIG. 9A embodiment.

Figure 9C:
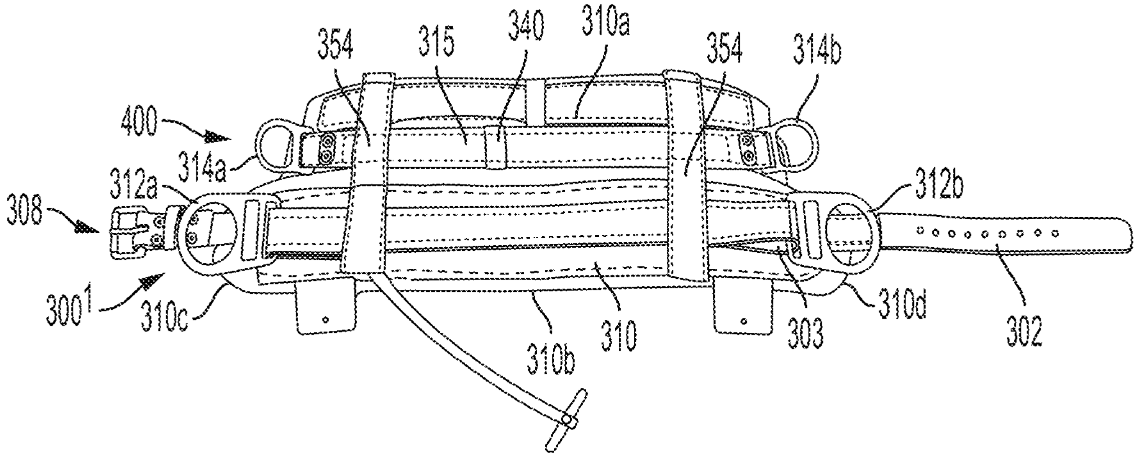
FIG. 9C is a front perspective view of a double body belt having primary body belt and a secondary body belt according to an alternative embodiment.

Turning to FIG. 9C, a front perspective view of a double body belt having primary body belt and a secondary body belt according to an alternative embodiment is shown. This alternative embodiment shows a double body belt having an alternative primary body belt 300', and also includes the secondary body belt 400 as show in the FIG. 9A embodiment. Alternative primary body belt 300' includes d-rings 312*a* and 312*b*, and buckle 308 connectable to primary belt strap 302, where the primary belt strap 302 does not pass through either d-ring 312*a* and 312*b* (shown passing underneath each d-ring 312*a* and 312*b*).

Figure 9D:
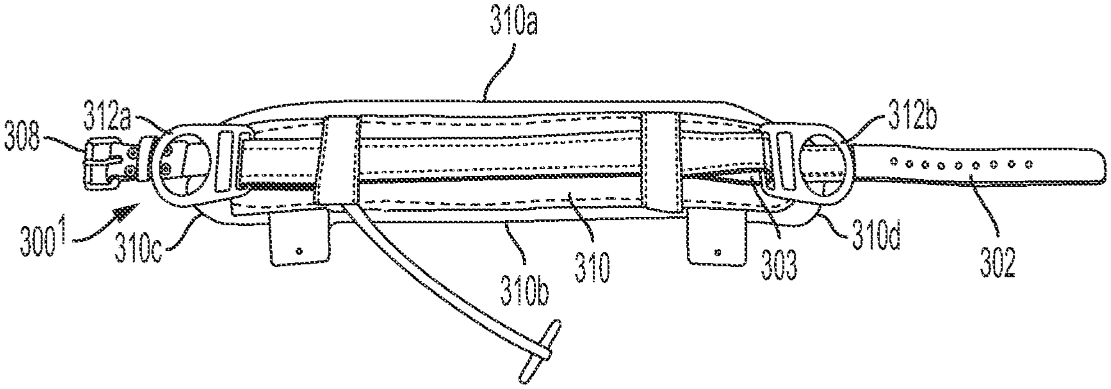
FIG. 9D is a front perspective view of a body belt having primary body belt, according to an alternative embodiment.
Figure 10A:
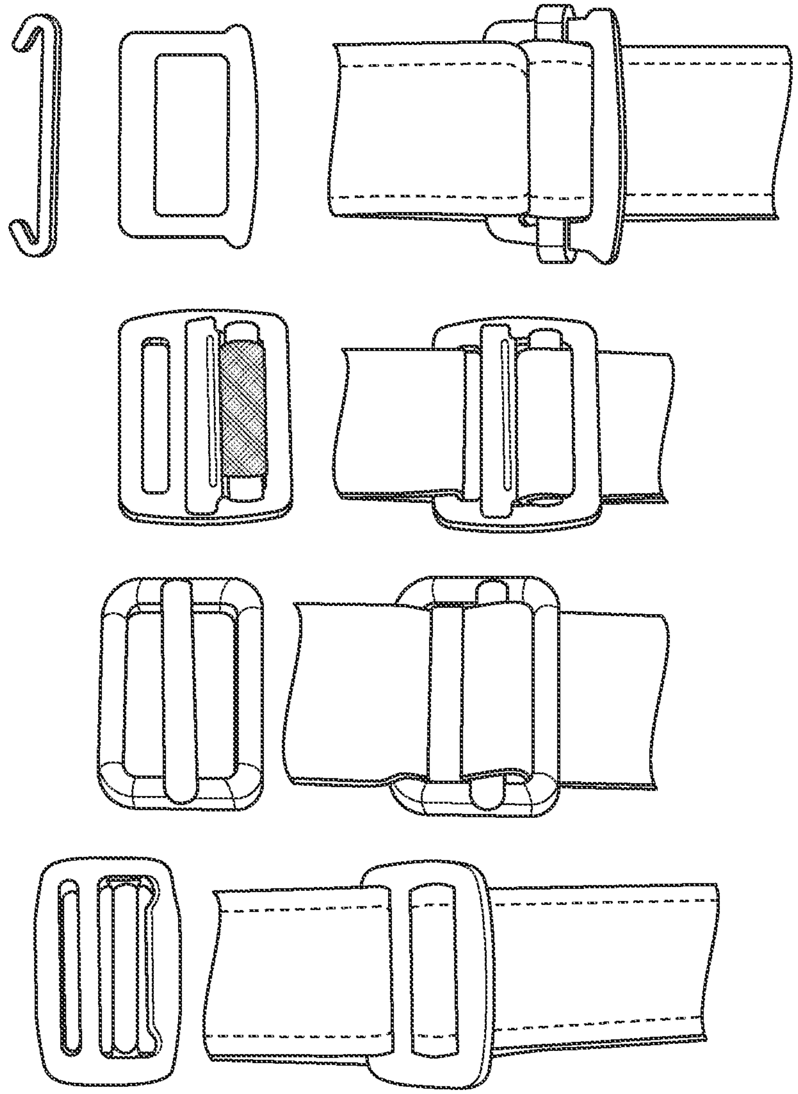
FIG. 10A is a front perspective view of an embodiment of the invention where the adjustability section is a movable bar friction buckle.
Figure 10B:
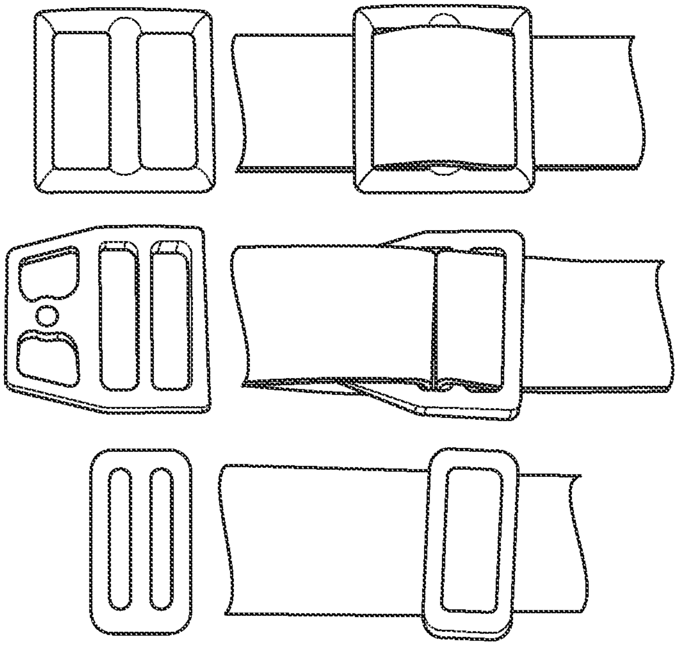
FIG. 10B is a front perspective view of an embodiment of the invention where the adjustability section is a fixed bar friction buckle.
Figure 10C:
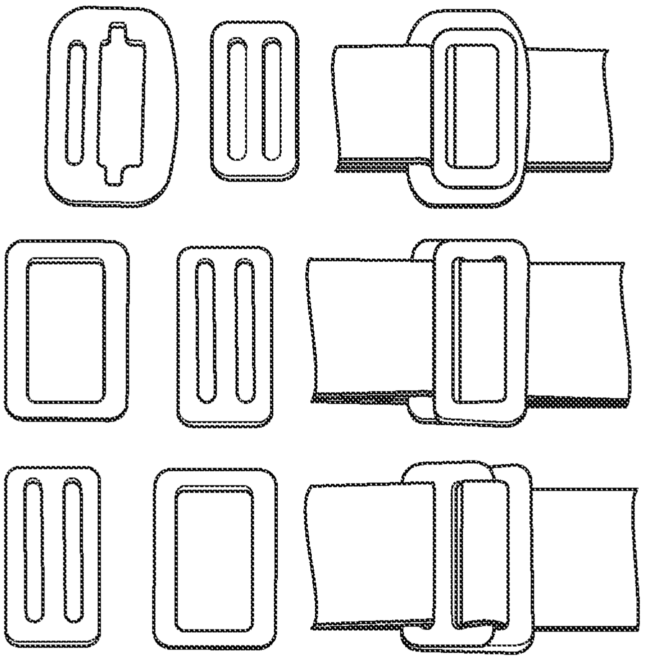
FIG. 10C is a front perspective view of an embodiment of the invention where the adjustability section is an interlocking friction buckle.
Figure 10D:
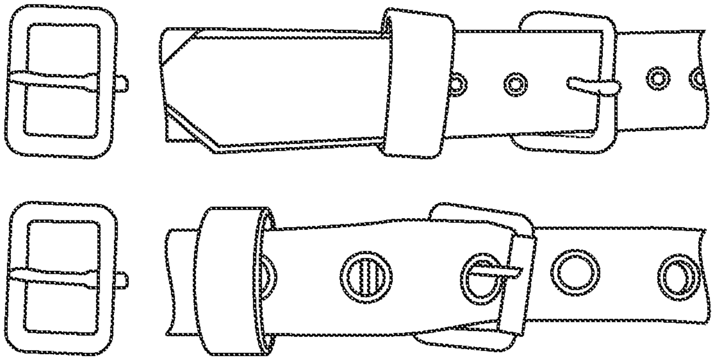
FIG. 10D is a front perspective view of an embodiment of the invention where the adjustability section is a tongue buckle.
Figure 10E:
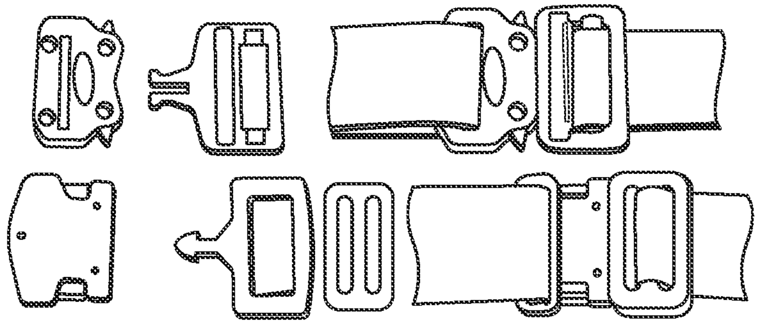
FIG. 10E is a front perspective view of an embodiment of the invention where the adjustability section is a quick connect buckle.
Figure 10F:
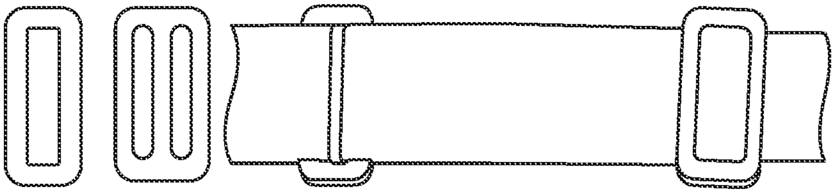
FIG. 10F is a front perspective view of an embodiment of the invention where the adjustability section is a friction buckle and link.
Figure 10G:
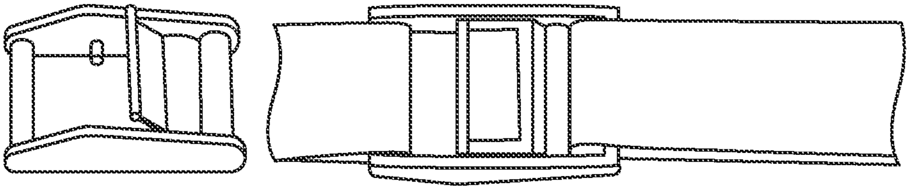
FIG. 10G is a front perspective view of an embodiment of the invention where the adjustability section is a cam buckle.
Figure 10H:
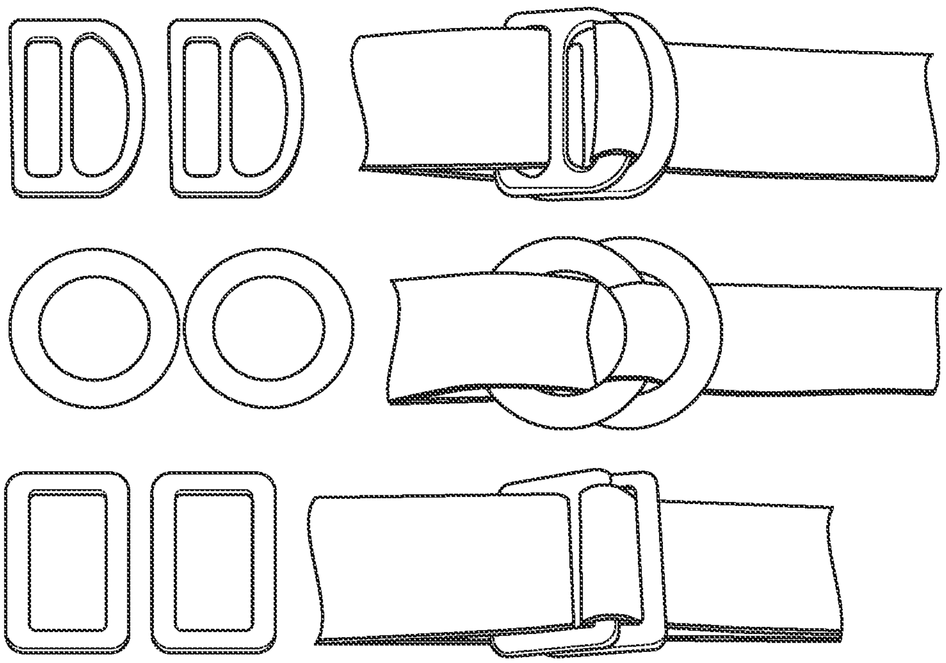
FIG. 10H is a front perspective view of an embodiment of the invention where the adjustability section is a ring friction buckle.

Turning to FIG. 9D, a front perspective view of a primary body belt 300' according to an alternative embodiment is shown. This alternative embodiment shows the alternative primary body belt 300', as shown in FIG. 9C, which includes d-rings 312*a* and 312*b*, body portion 310, and buckle 308 connectable to primary belt strap 302, where the primary belt strap 302 does not pass through either d-ring 312*a* and 312*b* (shown passing underneath each d-ring 312*a* and 312*b*).

Figure 12A:
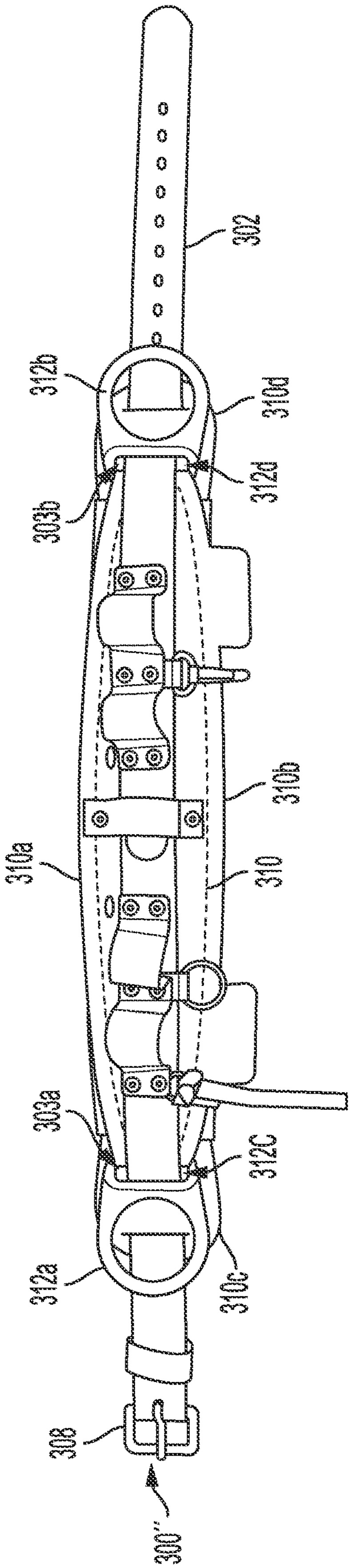
FIG. 12A is a front perspective view of a primary body belt in accordance with an embodiment.
Figure 12B:
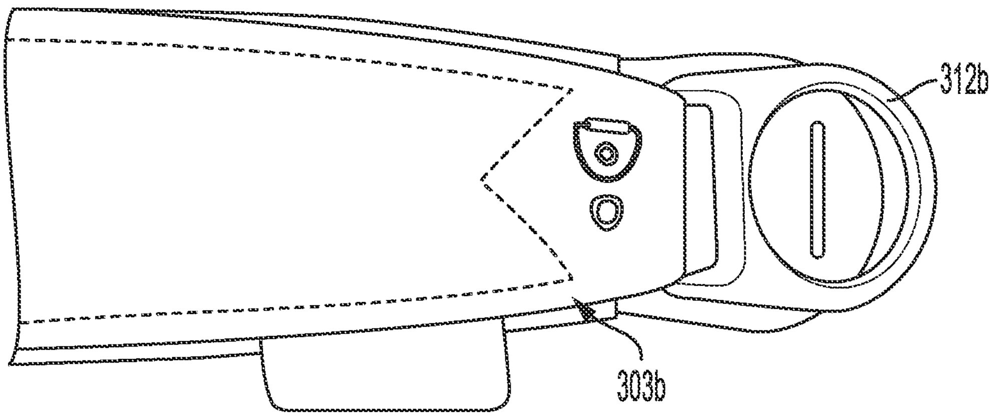
FIG. 12B is a front perspective view of the right side portion of the primary body belt shown in FIG. 12A in accordance with an embodiment.

In accordance with an embodiment, a belt strap and a D-piece (embodiments of which are described herein) can be attached to the first surface of the body portion, and to each other, in a number of different ways. For example, a front perspective view of a primary body belt 300" according to an alternative embodiment is shown in FIG. 12A. This alternative embodiment shows the alternative primary body belt 300", which includes d-rings 312*a* and 312*b*, body portion 310 (with the first surface facing out of the page, opposite a second surface which faces a user during use), and buckle 308 connectable to primary belt strap 302, where the primary belt strap 302 passes through a slot 312*c* and 312*d* in each d-ring 312*a* and 312*b*. D-piece 303 is connected (e.g., stitched or riveted or other means as should be appreciated by a person of skill in the art in conjunction with a review of this disclosure) to the first surface of the body portion 310 at its two ends 303*a* and 303*b* (however, it could be stitched at one point more toward the center of the D-piece), essentially fixing the D-Piece 303, and thus each d-ring 312*a* and 312*b*, to the first surface of the body portion 310. See also FIG. 12B. The D-piece 303 is indirectly connected to the belt strap 302 in this illustration, by virtue of the belt strap 302 being weaved through a slot positioned in each d-ring (each of which is directly connected to the D-piece 303). At least one connecting loop strap or bridge piece (not shown), which is itself fixed to the body portion 310, can also be used to indirectly connect the belt strap 302 and D-piece 303, either together along the same axis or separately along separate axes (as in the multiple body belt embodiments). Stated differently, the belt strap 302 can be positioned through the at least one connecting loop strap or bridge piece. The belt strap 302 is considered floating in this embodiment, meaning that it is moveably connected to the first surface of the body portion 310 (via slots 312*c* and 312*d* and/or connecting loop strap or bridge piece), i.e, the belt strap 302 is configured to move axially along its axis (where the D-piece does not so move) with respect to the first surface of the body portion 310.

Figure 13A:
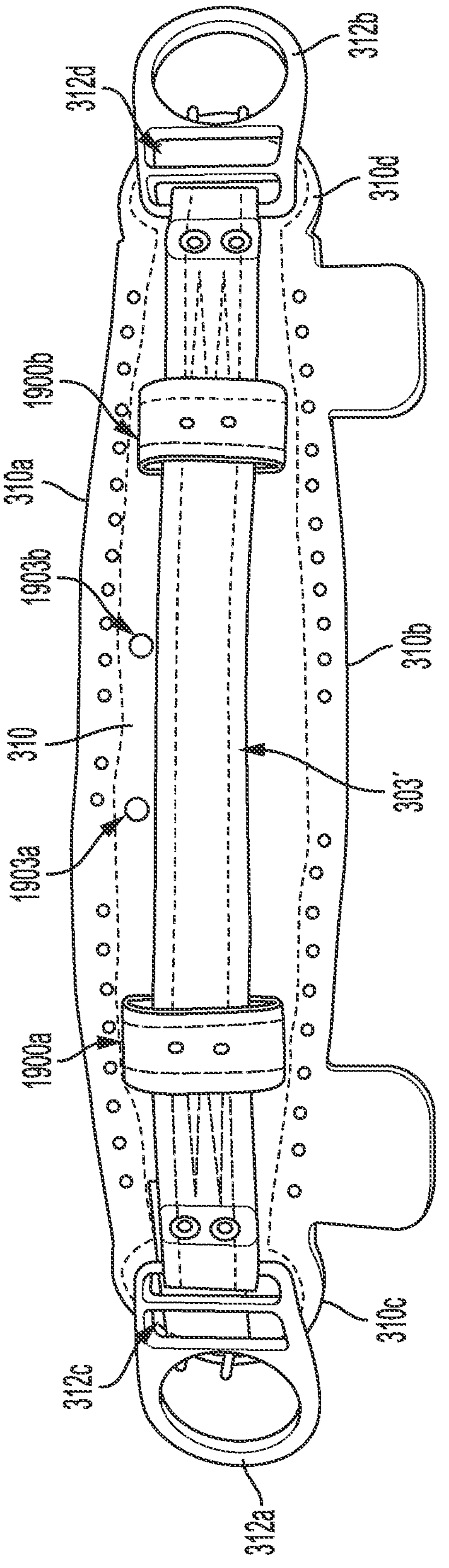
FIG. 13A is a front perspective view of a primary body belt in accordance with an embodiment.
Figure 13B:
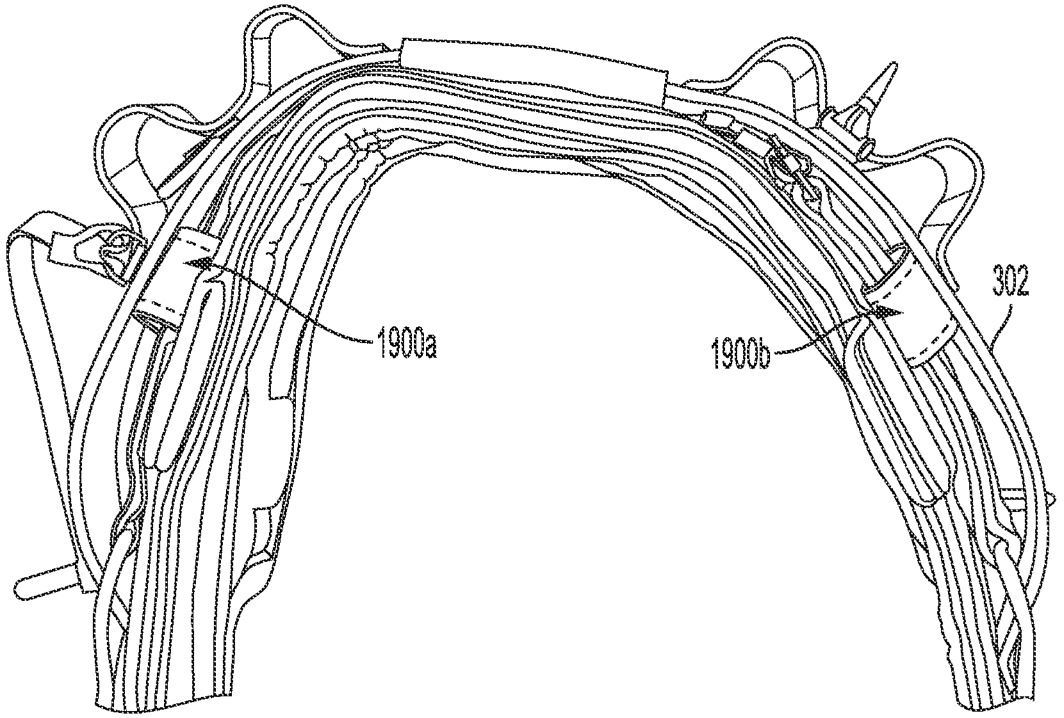
FIG. 13B is a front perspective view of the primary body belt shown in FIG. 13A with the addition of a belt strap positioned over the D-piece shown in FIG. 13A.

Turning to FIG. 13A, a front perspective view of a primary body belt 300" according to an alternative embodiment is shown. The D-piece 303' is configured to float in this embodiment, meaning that it is configured to move axially along its axis (as described with an embodiment of the belt strap 302, above). As opposed to the embodiment shown and described with respect to FIGS. 12A-12B, the D-piece 303' in this embodiment is moveably connected to the first surface of the body portion 310 by at least one connecting loop strap or bridge piece 1900*a* and 1900*b*, and is not fixed to (but is able to move with respect to) the first surface of the body portion 310. A belt strap 302, shown in FIG. 13B, can be positioned over D-piece 303', the ends of which can weave through the d-ring slots 312*c* and 312*d*. The belt strap 302 can float along its axis with respect to the first surface of the body portion 310 (as described above), or can be fixed with respect to the first surface of the body portion 310 by, for example, rivets positioned through rivet holes 1903*a* and 1903*b*.

In accordance with an embodiment, the adjustability sections shown and described herein can be connected to any body belt or D-piece shown and described herein to be positioned, structured and/or configured to allow adjustment of the length of any such belt strap or D-piece along the a major axis thereof.

The "connections" described herein can be described as mechanical connections. "Mechanically connected" can include both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

The terms “primary,” “secondary,” auxiliary” and “tertiary” are used to indicate one part vs. another in a certain figure, and are not used—in and of themselves—to specifically limit any particular described embodiment to a particular structural configuration.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A body belt assembly, comprising:

a body portion comprising a surface;

a belt strap connected to the surface of the body portion and comprising a first section and a separate second section, wherein the first section further comprises a first end and a second end and the second section further comprises a first end and a second end;

wherein the first end of the first section is adjacent to the first end of the second section and the second ends of the first and second sections extend in opposing directions from their respective first ends;

wherein the second end of the first section of the belt strap terminates in a first portion of a first adjustability section and the second end of the second section of the belt strap terminates in a second portion of the first adjustability section;

wherein the second section of the belt strap comprises a second adjustability section configured to change an effective length of the belt strap to alter a distance between the second end of the first section of the belt strap and the second end of the second section of the belt strap;

a D-piece connected to the surface of the body portion and extending between a first end and a second end;

a first primary D-ring positioned at the first end of the D-piece and a second primary D-ring positioned at the second end of the D-piece;

wherein the belt strap extends through a first and second auxiliary D-ring; and wherein the D-piece is positioned between a secondary belt strap and the body portion.

2. The body belt assembly of claim 1, wherein the belt strap is positioned adjacent to and offset from the D-piece.

3. The body belt assembly of claim 1, wherein the first and second auxiliary D-rings are substantially positioned between the first and second primary D-rings.

4. The body belt assembly of claim 1, wherein the secondary belt strap extends through the first and second primary D-rings.

5. The body belt assembly of claim 1, wherein the D-piece is positioned in line with the secondary belt strap.

6. The body belt assembly of claim 1, wherein the first portion of the first adjustability section comprises a buckle.

7. The body belt assembly of claim 1, wherein the second portion of the first adjustability section comprises a plurality of apertures formed therethrough.

8. The body belt assembly of claim 1, wherein the first section is fixed to the body portion.

9. The body belt assembly of claim 8, wherein the first section is fixed to the body portion by a rivet.

10. The body belt assembly of claim 1, wherein the second adjustability section comprises a connector fixed to the body portion and having a first side and a second side.

11. The body belt assembly of claim 10, wherein the first end of the first section is secured to the first side of the connector and the first end of the second section is secured to the second side of the connector.

12. A body belt assembly, comprising:

a body portion comprising a surface;

a belt strap connected to the surface of the body portion and comprising a first section and a separate second section, wherein the first section further comprises a first end and a second end and the second section further comprises a first end and a second end;

wherein the first end of the first section is adjacent to the first end of the second section and the second ends of the first and second sections extend in opposing directions from their respective first ends;

wherein the second end of the first section of the belt strap terminates in a first portion of a first adjustability section and the second end of the second section of the belt strap terminates in a second portion of the first adjustability section;

wherein the second section of the belt strap comprises a second adjustability section configured to change an effective length of the belt strap to alter a distance between the second end of the first section of the belt strap and the second end of the second section of the belt strap;

a D-piece connected to the surface of the body portion and extending between a first end and a second end;

a first primary D-ring positioned at the first end of the D-piece and a second primary D-ring positioned at the second end of the D-piece;

wherein the belt strap is positioned adjacent to and offset from the D-piece; and wherein the D-piece is positioned between a secondary belt strap and the body portion.

13. The body belt assembly of claim 12, wherein the belt strap extends through a first and second auxiliary D-ring.

14. The body belt assembly of claim 13, wherein first and second auxiliary D-rings are substantially positioned between the first and second primary D-rings.

15. The body belt assembly of claim 12, wherein the secondary belt strap extends through the first and second primary D-rings.

16. The body belt assembly of claim 12, wherein the D-piece is positioned in line with the secondary belt strap.

17. The body belt assembly of claim 12, wherein the first portion of the first adjustability section comprises a buckle.

18. The body belt assembly of claim 12, wherein the second portion of the first adjustability section comprises a plurality of apertures formed therethrough.

19. The body belt assembly of claim 12, wherein the first section is fixed to the body portion.

20. The body belt assembly of claim 19, wherein the first section is fixed to the body portion by a rivet.

21. The body belt assembly of claim 12, wherein the second adjustability section comprises a connector fixed to the body portion and having a first side and a second side.

22. The body belt assembly of claim 21, wherein the first end of the first section is secured to the first side of the connector and the first end of the second section is secured to the second side of the connector.

* * * * *